(No Model.)

H. Z. GIBSON.
EGG BEATER.

No. 293,648. Patented Feb. 19, 1884.

Witnesses:
Mrs B Munger
Joseph B. Clarke

Inventor:
Hannah Zephyrene Gibson.

N. PETERS, Photo-Lithographer, Washington, D. C.

UNITED STATES PATENT OFFICE.

HANNAH ZEPHYRENE GIBSON, OF OBERLIN, OHIO.

EGG-BEATER.

SPECIFICATION forming part of Letters Patent No. 293,648, dated February 19, 1884.

Application filed November 5, 1883. (No model.)

*To all whom it may concern:*

Be it known that I, HANNAH Z. GIBSON, a citizen of the United States, residing in Oberlin, in the county of Lorain and State of Ohio, have invented a new and useful Egg-Beater, of which the following is a specification.

My invention relates to improvements in egg-beaters in which strips of metal or wires bent into curved forms are made to rotate rapidly by multiplying-wheels propelled by the hand.

The objects of my improvement are, first, to preserve the substance of the egg from being cut or torn while it is beaten to a light froth or foam; second, to render the labor of beating less by giving the beater a firm support; third, to place the beater in such relation to the bowl of egg that both shall be independently supported in the most favorable position for beating; fourth, to improve the form of the beater, so as to render it more easily cleansed; fifth, to make an easier adjustment of the position of the beater and the bowl of egg to each other; sixth, to render all the parts separable for ease in cleaning, adjusting, or packing. I attain these objects by the mechanism illustrated in the accompanying drawings, in which—

Figure 1:
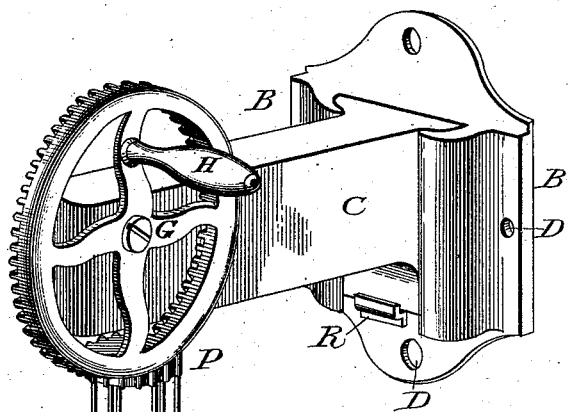
Figure 3:
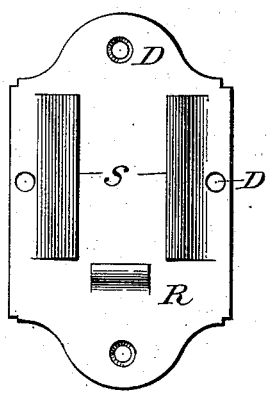
Figure 2:
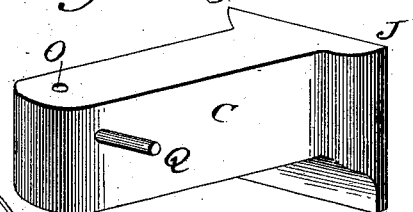
Figure 4:
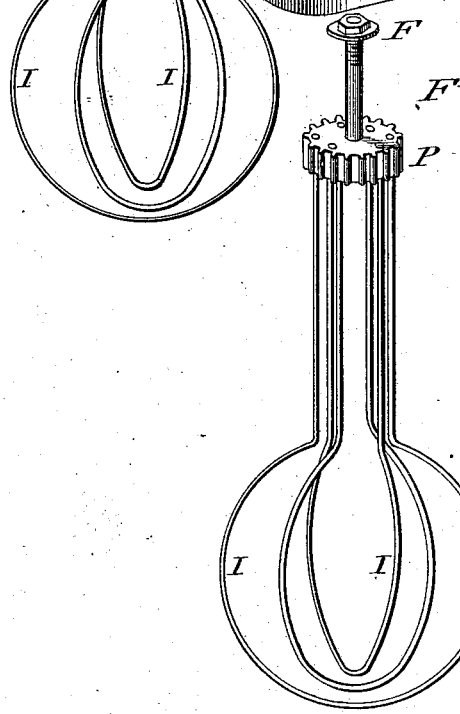
Figure 5:
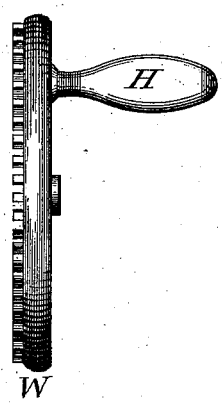

Figure 1 is a perspective view of the egg-beater complete. Fig. 2 is the arm to which the wheels are attached, and by which they are held to the bracket. Fig. 3 is the slotted bracket into which the arm slips, and by which it is firmly attached to the wall of a room or to a post. Fig. 4 is the pinion-wheel, to which the wires of the beater are attached permanently; and Fig. 5 is the driving-wheel.

Similar letters refer to similar parts throughout the several views.

My egg-beater consists of the bracket B B, Figs. 1 and 3, which contains a dovetailed slot, S, with a stop, R, and may be secured to the wall by screws, (seen at D D.) Into this slot the arm C, Figs. 1 and 2, made with a flange, H H, is slipped, so fitted as to remain in one position when the machine is at work, and to be easily removable at other times. The arm is bored at O, Fig. 2, to receive the axis of the pinion, and carries a center-pin, Q, on which the driving-wheel W, Fig. 1, turns. The pinion P, Fig. 4, preferably of iron or steel, nickel-plated, carries the axis F, to which it is permanently fixed, and which sustains the curved wires I I I. The wires are riveted to the pinion and all revolve one way, and are similar in form, except that they do not touch each other at the bottom within an eighth of an inch or more. They are (large) an eighth of an inch or more in diameter. The driving-wheel W, Figs. 1 and 5, is made with gear-teeth on one of its edges, adapted to the pinion P, and is provided with a handle, H.

What I claim as my invention, and desire to secure by Letters Patent, is—

1. The large cylindrical wires, all revolving in the same direction, substantially as described.

2. The revolving wires, all permanently attached to a single pinion, substantially as described, and for the purpose set forth.

3. The combination of the arm, bracket, and driving-wheel with the pinion and wires, substantially as described, and for the purpose set forth.

4. The revolving wires separated at the bottom, as described, and for the purpose set forth.

HANNAH ZEPHYRENE GIBSON.

Witnesses:
C. H. CHURCHILL,
WM. B. MUNGER.